United States Patent
Lu et al.

(10) Patent No.: US 11,627,111 B2
(45) Date of Patent: Apr. 11, 2023

(54) SYSTEMS AND METHODS FOR IMPLEMENTING UNIVERSAL TARGETS IN NETWORK TRAFFIC CLASSIFICATION

(71) Applicant: Cisco Technology, Inc., San Jose, CA (US)

(72) Inventors: Mingzhe Lu, Fremont, CA (US); Hongqing Li, Sunnyvale, CA (US); Diana Leung, Los Altos, CA (US); Jialiang Zhang, San Jose, CA (US); Madhusudan V. Gindi, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 277 days.

(21) Appl. No.: 16/806,794

(22) Filed: Mar. 2, 2020

(65) Prior Publication Data
US 2021/0273910 A1 Sep. 2, 2021

(51) Int. Cl.
*H04L 29/06* (2006.01)
*H04L 9/40* (2022.01)

(52) U.S. Cl.
CPC ...... *H04L 63/0245* (2013.01); *H04L 63/0272* (2013.01); *H04L 63/104* (2013.01); *H04L 63/20* (2013.01)

(58) Field of Classification Search
CPC ............. H04L 63/0245; H04L 63/0272; H04L 63/104; H04L 63/20; H04L 47/2433; H04L 63/105; H04L 45/64
See application file for complete search history.

(56) References Cited

U.S. PATENT DOCUMENTS

| 9,692,705 | B1* | 6/2017 | Zhou | H04L 47/2433 |
| 2008/0310440 | A1* | 12/2008 | Chen | H04L 47/32 370/413 |
| 2013/0151685 | A1* | 6/2013 | Bursell | G06F 9/455 709/223 |

(Continued)

FOREIGN PATENT DOCUMENTS

| WO | WO 2017/015667 A1 | 1/2017 |
| WO | WO 2017/120512 A1 | 7/2017 |

OTHER PUBLICATIONS

International Search Report and Written Opinion from the International Searching Authority, dated May 19, 2021, 12 pages, for corresponding International Patent Application No. PCT/US2021/018227.

(Continued)

*Primary Examiner* — John B King
(74) *Attorney, Agent, or Firm* — Polsinelli (57) ABSTRACT

The present technology discloses systems, methods, and computer-readable media to establish at least one target for a network, the target including at least one of an ingress parameter or an egress parameter and a policy for network packets; receive at least one network packet on the network; search for at least one matching target from the at least one targets, the at least matching target comprising parameters that match the at least one network packet; apply a policy in the at least one matching target to the at least one network packet; and forward the at least one network packet in accordance with the policy.

17 Claims, 4 Drawing Sheets

(56) References Cited

U.S. PATENT DOCUMENTS

| | | | |
|---|---|---|---|
| 2013/0188489 A1* | 7/2013 | Sato | H04L 63/1441 370/235 |
| 2014/0052836 A1* | 2/2014 | Nguyen | H04L 47/2475 709/223 |
| 2014/0177634 A1* | 6/2014 | Jiang | H04L 45/64 370/392 |
| 2014/0289840 A1* | 9/2014 | Jain | H04L 63/164 726/13 |
| 2014/0317684 A1* | 10/2014 | Porras | H04L 63/0227 726/1 |
| 2015/0237015 A1* | 8/2015 | Bansal | H04L 63/20 726/13 |
| 2015/0281179 A1* | 10/2015 | Raman | H04L 63/0272 726/11 |
| 2015/0281180 A1* | 10/2015 | Raman | G06F 9/45558 726/15 |
| 2016/0014028 A1* | 1/2016 | He | H04L 45/745 370/392 |
| 2017/0026417 A1* | 1/2017 | Ermagan | H04L 63/20 |
| 2017/0201537 A1* | 7/2017 | Caldwell | H04L 63/1416 |
| 2017/0317976 A1* | 11/2017 | Chalvadi | H04L 47/24 |
| 2018/0115470 A1* | 4/2018 | Huang | H04W 28/24 |
| 2019/0253274 A1* | 8/2019 | Van Dussen | H04L 12/4641 |
| 2020/0351211 A1* | 11/2020 | Kunz | H04L 47/283 |
| 2021/0218774 A1* | 7/2021 | Mittal | H04L 63/164 |

OTHER PUBLICATIONS

Pisharody, Sandeep, et al., "Brew: A Security Policy Analysis Framework for Distributed SDN-Based Cloud Environments," IEEE Transactions on Dependable and Secure Computing, IEEE Service Center, New York, NY, US, Nov. 1, 2019, pp. 1011-1025.

* cited by examiner

SYSTEMS AND METHODS FOR IMPLEMENTING UNIVERSAL TARGETS IN NETWORK TRAFFIC CLASSIFICATION

TECHNICAL FIELD

The present disclosure generally relates to policy frameworks in networking environments, and more specifically relates to a scheme for implementing overlapping ingress- and egress-based networking policies on network devices.

BACKGROUND

Implementing policies in networking environments is a crucial aspect of modern operations. Policies can define access to services by user, device, location, or other factors necessary to maintain network security and allow networking environments to run optimally. However, existing networking policy schemes do not always offer the granularity to implement multiple overlapping policies specific to origins and destinations of traffic, and to do so at the level of a network device.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

The disclosed technology presents a solution for implementing granular, overlapping ingress-based and egress-based policies in a networking environment. The solution details methods, systems, and non-transitory computer-readable media for implementing this solution.

In one aspect, a non-transitory computer readable medium includes computer-readable instructions stored thereon, which when executed by one or more processors, cause the one or more processors to establish at least one target for a network, the at least one target including at least one of an ingress parameter or an egress parameter, and a policy for network packets; receive at least one network packet on the network; search for at least one matching target from the at least one targets, the at least one matching target comprising parameters that match the at least one network packet; apply a policy in the at least one matching target to the at least one network packet; and forward the at least one network packet in accordance with the policy.

In one aspect, a method includes establishing at least one target for a network, the target include at least one of an ingress parameter or an egress parameter, and a policy for network packets; receiving at least one network packet on the network; searching for at least one matching target from the at least one targets, the at least one matching target comprising parameters that match the at least one network packet; applying a policy in the at least one matching target to the at least one network packet; and forwarding the at least one network packet in accordance with the policy.

In one aspect, a device includes memory having computer-readable instructions stored therein; and one or more processors configured to execute computer-readable instructions to establish at least one target for a network, the target including at least one of an ingress parameter or an egress parameter, and a policy for network packets; receive at least one network packet on the network; search for at least one matching target from the at least one targets, the at least one matching target comprising parameters that match the at least one network packet; apply a policy in the at least one matching target to the at least one network packet; and forward the at least one network packet in accordance with the policy.

Example Embodiments

The disclosed technology addresses the need in the art for implementing granular, overlapping ingress- and egress-based policies in a networking environment. Prior to describing such examples embodiments, several example configurations in which the above concepts can be deployed and utilized, will be described first.

The disclosure now turns to an initial discussion of example concepts and technologies for the present technology.

In modern networking environments, network devices can be asked to manage traffic from and to a wide variety of sources: locations from around the globe, internal versus external traffic, service requests from individuals with different levels of access permissions, and many other factors. These environments require granular policies to account for the multiplicity of network flows handled by these devices.

The present technology presents a solution allowing for granular, overlapping ingress- and egress-based policies in a networking environment. Targets define an ingress-to-egress traffic flow and couple it with a policy. Ingress and egress variables can include location, user context, device context, or a host of other factors to allow policies to be applied granularly. These targets can overlap and thus policy infrastructure can be built at a granular level.

Targets and their policies are implemented at a policy enforcement point on a networking device, such as a router. Incoming network traffic passes through the policy enforcement point, where targets matching the network traffic are found and their policies are applied.

Figure 1:
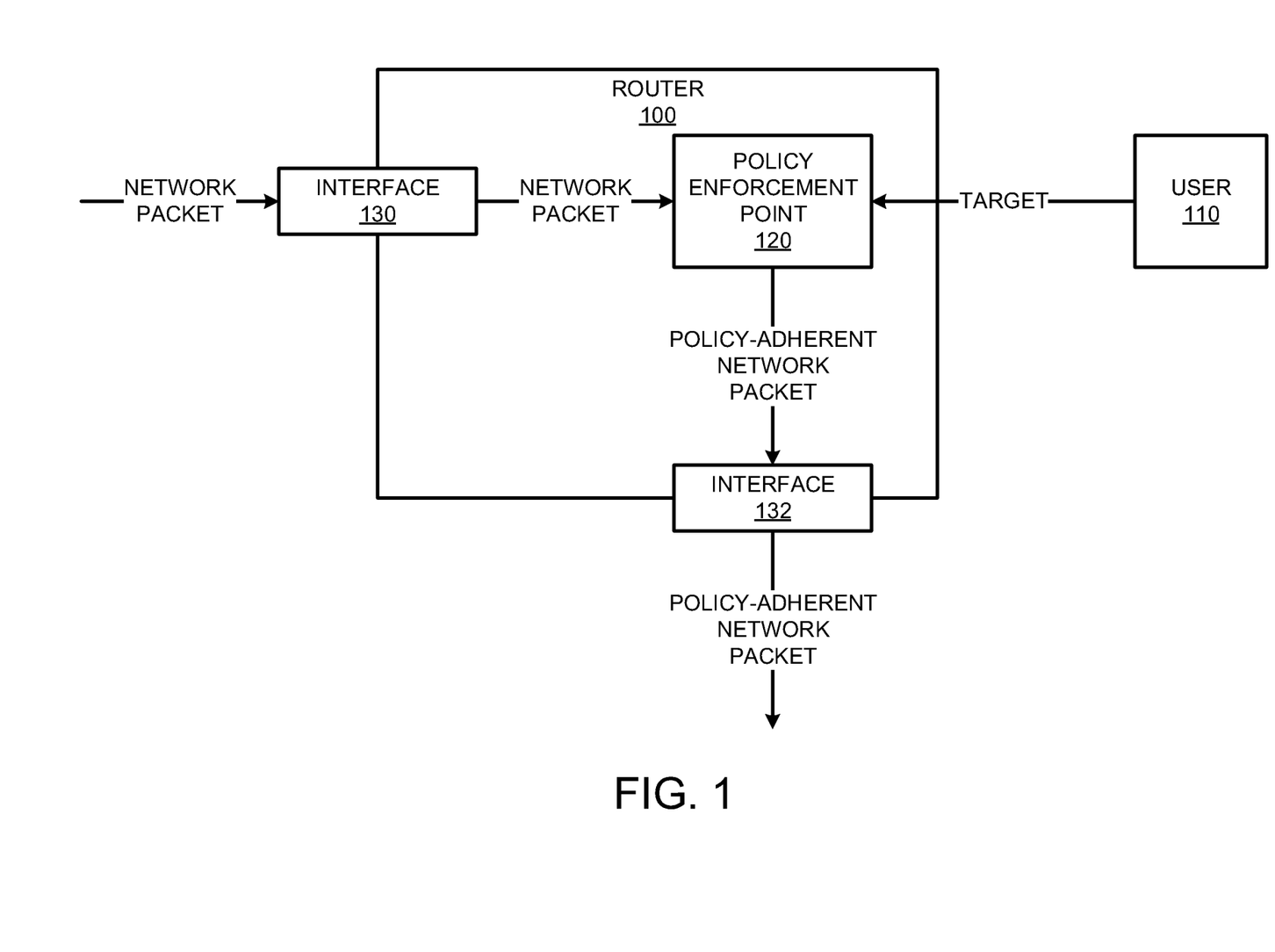
FIG. 1 illustrates an example system in accordance with some aspects of the present technology.

FIG. 1 illustrates an example router 100 in accordance with the present technology. Router 100 can receive targets containing policies for network packets from user 110, which are then applied to receive network packets at policy enforcement point 120.

Router 100 can be any networking device which relays network traffic in a networking environment. It can be an edge, border, or other networking device. It can receive, transmit, or halt network traffic in a networking environment. It handles traffic through interfaces 130 and 132.

Router 100 hosts a policy enforcement point 120. Policy enforcement point 120 is an engine which applies policies from matching targets to incoming and outgoing network traffic. It can be a hardware component, software component, virtual component, or a combination. A target defines ingress or egress variables which match the flow of a network packet, and further defines a policy to be applied those network packets.

User 110 sends a target for a networking environment to policy enforcement point 120. User 110 can be a network administrator or other network policy expert.

Incoming network packets to router 100 can contain traffic flow information: their departure point (ingress), destination point (egress), and policy group information. These parameters can name virtual private networks, users, devices, locations, or other factors. Policy group information can include information about the user sending the network packet, the device at which the network packet originated, the physical location of the network packet's origin, or other relevant information. In some embodiments, a parameter can be left blank, indicating that this parameter is not required for a match. In these cases, all traffics will meet this match criterion. In some embodiments, parameters can be ranges, indicating many matching values to a policy. For instance, an ingress parameter can include a large demarcated geographic area, or an egress parameter can include a set of VPNs.

Figure 2:
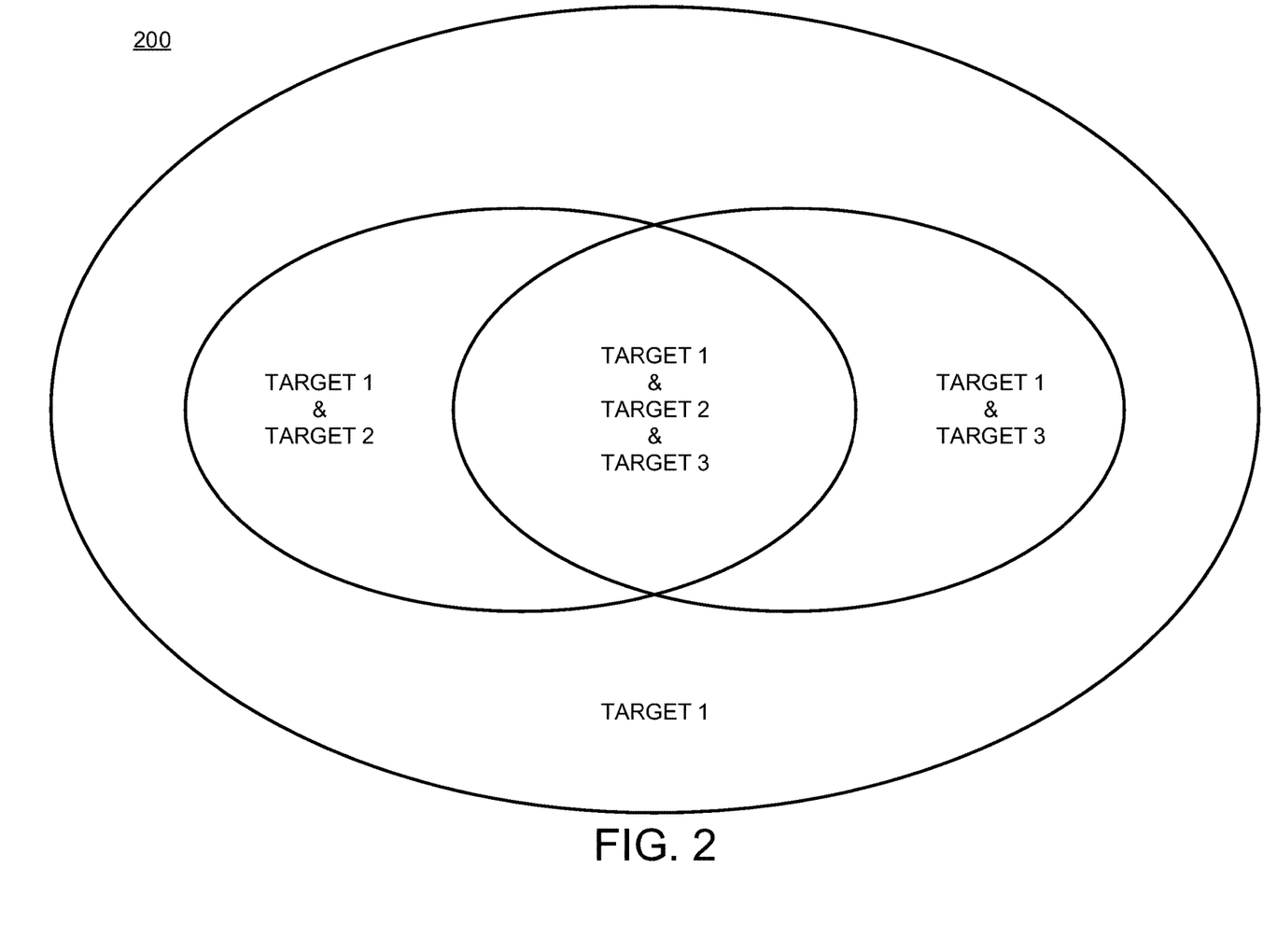
FIG. 2 illustrates a schematic diagram in accordance with some aspects of the present technology.

When policy enforcement point 120 receives a network packet, it can read ingress, egress, and policy group information on the network packet. Subsequently, it can search internally for targets received from user 110 which match the network packet's ingress, egress, or policy group information. Once found, policy enforcement point 120 can apply policies from the matching targets to the network packet. A network packet can have multiple matching targets; in these cases, policies from all matching targets can be applied to the network packet. FIG. 2 illustrates an example of how multiple targets can "overlap" and apply to the same network packet.

A policy constitutes some restriction on the flow of a network packet. It specifies how network points (defined in the ingress and egress parameters) are allowed to communicate with each other. For instance, a target with an egress parameter containing a server holding confidential information may have a policy requiring that a sufficient security clearance be present in the network packet.

In some cases, multiple targets will match a single network packet, demanding that multiple policies be enforced. When this occurs, policy enforcement point 120 can apply the policies using a designated sequence, which can deal with the "level" of targets. A high-level target is one that is a superset of another target, while a low-level target is a subset of another. This can be illustrated with the following example: assume that a target 1 is defined as the entirety of the United States, and target 2 is defined as the state of California. A residence in California will hit both target 1 and target 2, because California is included within the United States. Using tax laws as a policy example, both federal taxes (the policy from target 1) and California state taxes (the policy from target 2) will be applied to the residence. These ideas will be further elucidated in the discussion of FIG. 2.

One example sequence of policy application involves first applying ingress-matched target policies from highest-level to lowest-level, and then applying egress-matched target policies from lowest-level to highest-level.

FIG. 2 illustrates a schematic diagram in accordance with the present technology. Schematic 200 shows how targets can overlap, which can inform how they are applied.

Schematic 200 shows three example targets 1, 2, and 3 in an extended Venn diagram. Target 1 matches a subset X of all network traffic, and establishes a policy 1 for this traffic. Both target 2 and target 3 have policies 2 and 3 applying to subsets of X. For example, policy 1 may apply to all traffic originating in corporate headquarters, while policy 2 applies to all traffic originating in corporate headquarters flowing towards a branch office, and policy 3 applies to all traffic originating in corporate headquarters from project managers. This will result in some traffic which matches more than one target, as shown in schematic 200.

With more than one matching target, policy enforcement point 120 must determine the order in which to apply those targets' policies. Following the example sequence stated previously, in this case policy enforcement point 120 would first apply policy 1, then policy 2, then policy 3. This is because policy 1 has the highest-level ingress and no egress, policy 2 has the highest-level ingress and an egress, and policy 3 has the lowest-level ingress.

Figure 3:
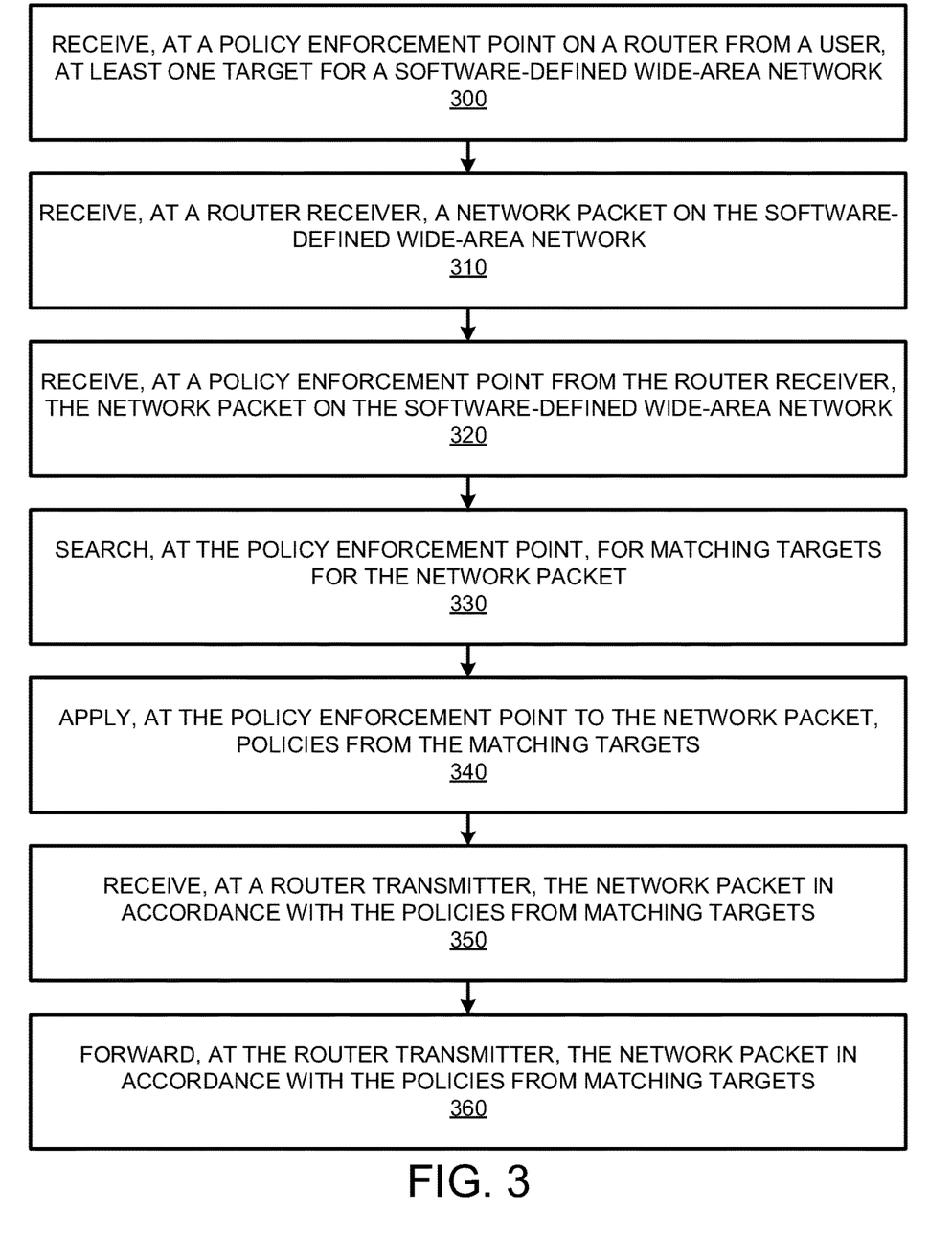
FIG. 3 illustrates an example method in accordance with some aspects of the present technology.

FIG. 3 illustrates an example method in accordance with some aspects of the present technology. It can be implemented by the system shown in FIG. 1.

At process 300, policy enforcement point 120 on router 100 receives a target from user 110. The target comprises at least one of an egress parameter or ingress parameter, and a policy to apply to network packets matching the parameters.

At process 310, interface 130 receives a network packet coming from a networking environment. Subsequently at process 320, policy enforcement point 120 receives this network packet from interface 130.

At process 330, policy enforcement point 120 searches for targets matching the network packet. Each target contains a policy and at least one of an ingress or egress parameter. These parameters are matched to the network packet so matching target policies can be ultimately be applied to the network packet. This search can be done sequentially or using any number of other algorithms.

At process 340, policy enforcement point 120 applies policies from targets matching the network packet. If there is more than one policy, these policies can be applied in pre-defined sequences, generated sequences, or in a random order.

At process 350, interface 132 receives the network packet with the policies from matching targets applied to it. At process 360, interface 132 forwards the network packet in accordance with those policies. It can send the network packet uninhibited to its destination, forward it with restrictions, or return an "access denied" notification to the origin of the traffic.

Figure 4:
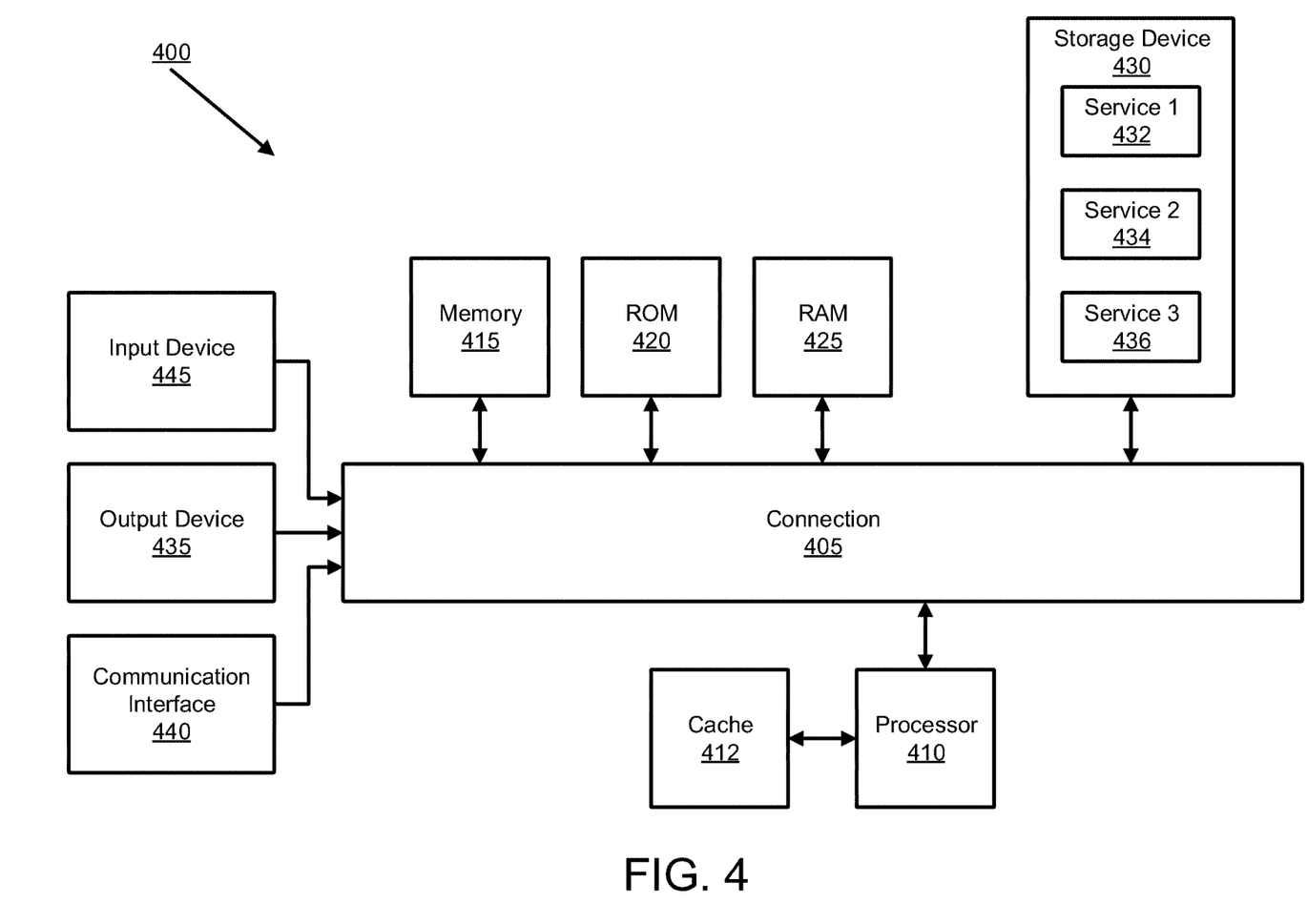
FIG. 4 illustrates an example computing device architecture in accordance with some examples of the present technology.

FIG. 4 shows an example of computing system 400, which can be for example any computing device making up router 100 or any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments computing system 400 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

The invention claimed is:

1. A non-transitory computer readable medium comprising computer-readable instructions stored thereon, which when executed by one or more processors, cause the one or more processors to perform operations comprising:
    establish a plurality of targets for a network, each of the plurality of targets including:
        at least one of an ingress parameter or an egress parameter, and
        a policy for network packets;
    receive at least one network packet on the network;
    identify at least two matching targets from the plurality of targets, the at least two matching targets comprising parameters that match the at least one network packet, each of the matching targets containing at least one policy;
    apply at least one of the policies from each of the at least two matching targets to the at least one network packet in a defined sequence; and
    forward the at least one network packet in accordance with the applied policies;
    wherein the defined sequence moves from:
        a highest-level ingress parameter matching target policy to a lowest-level ingress parameter matching target policy, or
        a lowest-level egress parameter matching target policy to a highest-level egress parameter matching target policy.

2. The non-transitory computer readable medium of claim 1, wherein the at least one ingress parameter or egress parameter is one of a virtual private network, a user policy group, a device policy group, or a wild card, wherein a wild card matches any network packet.

3. The non-transitory computer readable medium of claim 1, wherein the at least one ingress parameter or egress parameter is a range of parameters.

4. The non-transitory computer readable medium of claim 1, execution of the computer-readable instructions further causing the one or more processors to:
    receive specification of the at least one target from a user.

5. The non-transitory computer readable medium of claim 1, wherein the defined sequence moves from a highest-level ingress parameter matching target policy to a lowest-level ingress parameter matching target policy and from a lowest-level egress parameter matching target policy to a highest-level egress parameter matching target policy.

6. The non-transitory computer readable medium of claim 1, execution of the computer-readable instructions further causing the one or more processors to:
    search sequentially for the at least two matching targets from the plurality of targets.

7. A method comprising:
    establishing a plurality of targets for a network, each of the targets including:
        at least one of an ingress parameter or an egress parameter, and
        a policy for network packets;
    receiving at least one network packet on the network;
    identifying at least two matching targets from the plurality of targets, the at least two matching targets comprising parameters that match the at least one network packet;
    applying a policy from each of the at least two matching targets to the at least one network packet in a defined sequence; and
    forwarding the at least one network packet in accordance with the applied policies;
    wherein the defined sequence moves from:
        a highest-level ingress parameter matching target policy to a lowest-level ingress parameter matching target policy, or
        a lowest-level egress parameter matching target policy to a highest-level egress parameter matching target policy.

8. The method of claim 7, wherein the at least one ingress parameter or egress parameter is one of a virtual private network, a user policy group, a device policy group, or a wild card, wherein a wild card matches any network packet.

9. The method of claim 7, wherein the at least one ingress parameter or egress parameter is a range of parameters.

10. The method of claim 7, the method further comprising:
    receiving specification of the at least one target from a user.

11. The method of claim 7, wherein the defined sequence goes from a highest-level ingress parameter matching target policy to a lowest-level ingress parameter matching target policy and from a lowest-level egress parameter matching target policy to a highest-level egress parameter matching target policy.

12. The method of claim 7, the method further comprising:
    searching sequentially for the at least two matching targets from the plurality of targets.

13. A device comprising:
memory having computer-readable instructions stored therein; and
one or more processors configured to execute computer-readable instructions to:
  establish a plurality of targets for a network, the targets including:
    at least one of an ingress parameter or an egress parameter, and
    a policy for network packets;
  receive at least one network packet on the network;
  identify at least two matching targets from the plurality of targets, the at least two matching targets comprising parameters that match the at least one network packet, each of the matching targets containing at least one policy;
  apply at least one of the policies from each of the at least two matching targets to the at least one network packet in a defined sequence; and
  forward the at least one network packet in accordance with the applied policies;
wherein the defined sequence moves from:
a highest-level ingress parameter matching target policy to a lowest-level ingress parameter matching target policy, or
a lowest-level egress parameter matching target policy to a highest-level egress parameter matching target policy.

14. The device of claim 13, wherein the at least one ingress parameter or egress parameter is one of a virtual private network, a user policy group, a device policy group, or a wild card, wherein a wild card matches any network packet, or the at least one ingress parameter or egress parameter is a range of parameters.

15. The device of claim 13, wherein the one or more processors are further configured to execute the computer-readable instructions to:
  receive specification of the at least one target from a user.

16. The device of claim 13, wherein the defined sequence goes from a highest-level ingress parameter matching target policy to a lowest-level ingress parameter matching target policy and from a lowest-level egress parameter matching target policy to a highest-level egress parameter matching target policy.

17. The device of claim 13, the instructions further effective to cause the processor to:
  search sequentially for the at least two matching targets from the plurality of targets.

* * * * *